Nov. 22, 1966  R. T. ACKROYD ET AL  3,287,225
NUCLEAR REACTORS
Filed June 2, 1965  2 Sheets-Sheet 2
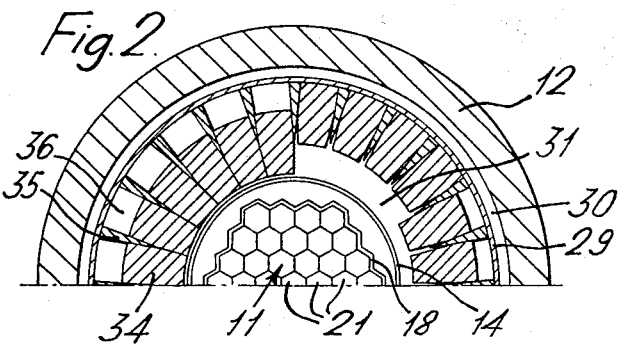
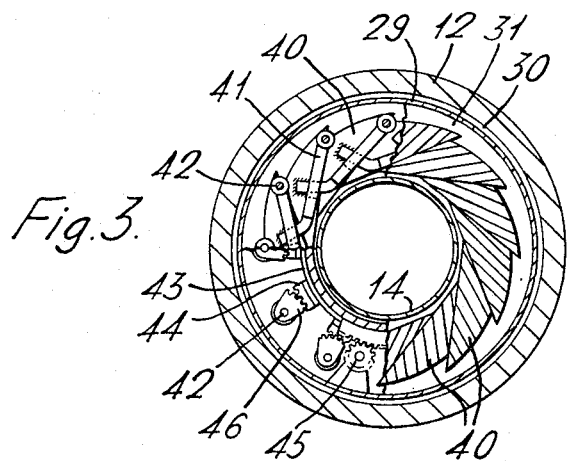
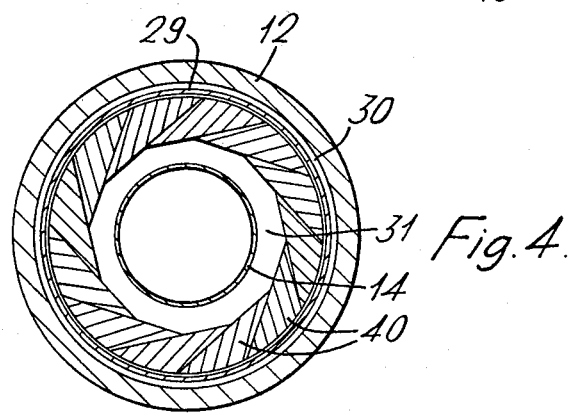

United States Patent Office
3,287,225
Patented Nov. 22, 1966

3,287,225
NUCLEAR REACTORS
Ronald Tunstall Ackroyd, Upton-by-Chester, Allan Barker, Chester, John Erskine Mann, Liverpool, and Maurice Arthur Perks, Warrington, England, assignors to United Kingdom Atomic Energy Authority, London, England
Filed June 2, 1965, Ser. No. 460,706
Claims priority, application Great Britain, June 2, 1964, 22,862/64
10 Claims. (Cl. 176—33)

The present invention relates to nuclear reactors; more specifically it concerns the reflector which is commonly provided around the reactor core for the purpose of reducing loss of neutrons by leakage. It is implicit that a reflector, whether solid or liquid, has good neutron scattering properties; examples are graphite, beryllium, water and heavy water.

Since neutron leakage from the core is dependent on the reflector, it is well known that some measure of control over the reactivity of the core can be obtained by movement of the reflector. This method of control has been put forward especially for fast reactors where the high energy neutron spectrum (having an average in excess of 1 kev.) renders neutron capturing materials like boron less effective than in thermal reactors where neutrons are to a large extent slowed down to thermal energies by a high moderator to fuel ratio. Thus, for fast reactors, it has been proposed already that a solid reflector surrounding the core is arranged for axial movement to enable variation of the reflected length of the core. With liquid reflectors, it has been proposed in a more general context that the level is variable, again for enabling the reflected length of the core to be varied.

According to the present invention, in a nuclear reactor having a reflector including adjacent radial zones of liquid and solid reflector both extending substantially continuously around the reactor core, the solid reflector is supported in a manner enabling the position thereof radially of the core to be varied with a consequential displacement of the liquid reflector. Due to differences of the neutron scattering cross sections of liquid and solid reflectors the neutron leakage is controllable in this way over the whole radial periphery of the core. Therefore, especially in small cores where leakage is particularly significant, it is possible to use this form of leakage control for holding down considerable amounts of excess reactivity.

For variation of its radial position, the solid reflector may be movable laterally of the core, whether by linear movement or rotation, or axially of the core. It is in the former case that strict continuity of the solid reflector around the core may not be achieved.

By way of illustration of the invention, particular embodiments taken by way of example only will now be described with reference to the accompanying drawings in which:

FIGURE 2 is a half plan view as seen on the line II—II of FIGURE 1, and

FIGURES 3 and 4 show in a plan view similar to that of FIGURE 2 the relevant features of a variant of the first embodiment.

Figure 1:
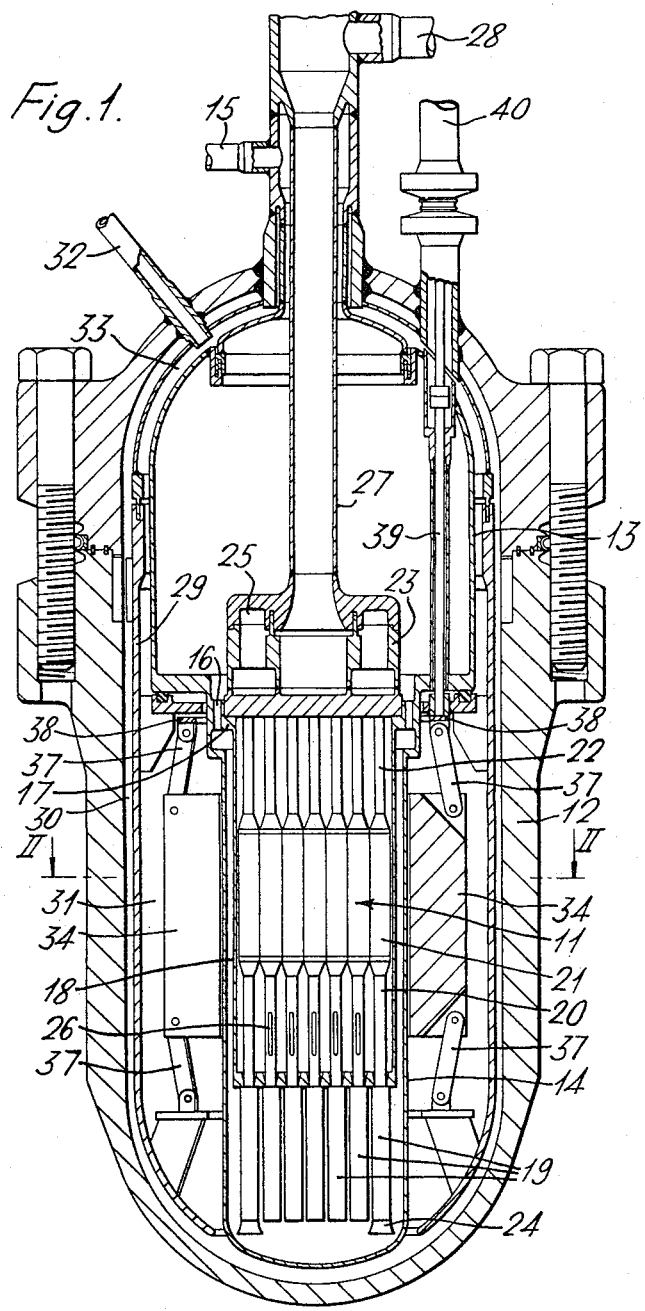
FIGURE 1 is a view in longitudinal section of a first embodiment.

The reactor in FIGURE 1, as also the variant of FIGURES 3 and 4, is a fast reactor of about 40 MW(T) in which the core is cooled by supercritically pressurised aqueous coolant. The core 11 is contained in a thick-walled pressure vessel 12 which has inside it a thin-walled inner vessel 13, of a shape rather like a toadstool, including as its lower part a cylindrical pot 14 in which the core 11 is fitted.

The coolant for passing through the core 11 is admitted to the bulbous upper part of the inner vessel 13 through a coolant inlet nozzle 15 at the top of the reactor pressure vessel 12 and from thence flows to the bottom of the pot 14 through a ring of perforations 16 in an inwardly projecting flange 17 of the pot by which is supported a skirt 18 conforming in shape to the hexagonal outline of the core 11 (FIGURE 2). At its lower end, this skirt 18 carries sockets 19 in which bottom spikes 20 of fuel assemblies 21 constituting the core are located. Top spikes 22 of these assemblies are located in a removable block 23 which seats in the flange 17. Between the top and bottom spikes the assemblies have hexagonal casings in which are carried arrays of fuel bodies, preferably in a plate-like form. Only in respect of the outer row of assemblies are the sockets 19 open, as at 24, to the coolant stream reaching the bottom of the pot 14 and therefore the coolant makes a first upward pass through this outer row. By means of an annular chamber 25 in the block 23, the first pass is followed by a second downward pass through the next row of assemblies. The assemblies in this next row have slotted apertures 26 in their bottom spikes 20 and this is also the case in respect of the group of assemblies composed of the control assembly and the row around it so that the second pass is followed by a third and final pass upwards through this group. On completion of the third pass the coolant is carried from the block 23 through a duct 27 to a coolant outlet nozzle 28 at the top of the reactor pressure vessel 12.

A liner 29 with a bottom opening through which the pot 14 projects is separated by a gap 30 from the inside surface of the pressure vessel 12 and forms with the pot a reflector compartment 31. An inlet nozzle 32 penetrating the pressure vessel from the exterior is in communication with the reflector compartment through a gap 33 left between the liner 29 and the bulbous upper part of the inner vessel 13. An outlet nozzle placed similarly to the inlet nozzle 32, but angularly displaced out of the plane of FIGURE 1 so as not to be seen, is in communication with the gap 30.

In the reflector compartment 31 is disposed a ring of 24 segments of stainless steel reflector material, each segment being in the form of an elongated block 34 extending over the length of the core and having its side faces parallel at the radially rearward half and slightly convergent at the forward half. Interposed between the blocks 34 are fixed stainless steel segments 35 of wedge shape which taper towards the core in a manner defining parallel sided pockets 36 in which the blocks 34 can move.

The blocks 34 are each supported by top and bottom links 37 arranged in the manner of a toggle type of linkage and the top links are suspended pivotally from a ring 38 to which is connected a screw and nut adjuster 39 with a drive unit 40. It is to be understood that guide means are included to maintain a horizontal attitude of the ring 38 and a vertical attitude of the blocks 34. Thus, by moving up and down the ring 38 by means of drive applied to the adjuster 39, the position of the blocks 34 of solid reflector material radially of the core is varied correspondingly and in a synchronous manner. The difference of position evident in the right and left hand quadrants of FIGURE 2 does not occur in fact and has been included only as a convenient way of showing how the blocks are situated in various positions.

Through the inlet nozzle 32, the reflector compartment 31 is supplied with liquid reflector which in the present case is the same as the coolant, the pressure being supercritical and the temperature not greater than, and preferably less than, the core inlet temperature. A flow of this liquid reflector through the reflector compartment takes place to the outlet nozzle communicating with the gap 30. Thus, as the solid reflector blocks 34 undergo an adjustment of position the consequential displacement of liquid reflector in the reflector compartment results in an interchange of the positions of the solid and liquid reflecting layers. For example, with the fuel in the core of the illustrated reactor in the form of mixed dioxides of plutonium and uranium, it is estimated that the full range of adjustment of the solid reflector blocks 34 can be made equivalent to a reactivity change of about 8%.

In the variant of FIGURES 3 and 4, the movable segments of solid reflector material are in the form of elongated wedges 40 which are so assembled and shaped that in each case one wedge face lies in a plane tangential to an imaginary cylindrical surface of slightly larger diameter than the pot 14 while the other wedge face lies in a plane parallel to, and closely adjacent to, the tangential face of the next neighbouring wedge, the overall appearance resembling an iris diaphragm. In this case the use of fixed segments is unnecessary. At both ends, each wedge has an arm 41 fixed thereto, the other end of the arm being pivotally mounted about an axis 43 which extends parallel to the planes of the wedge faces and is positioned with considerable offset from the respective wedge so as to enable the wedge to be swung in a shallow arc in the general direction of the more remote wedge face.

The arms 41 appearing in FIGURE 3 are those at the upper ends of the wedges 40; the quadrant in which they appear is to be understood to be a section above the wedges. The lower left hand quadrant represents a still higher section and illustrates a suitable drive mechanism: A rotary ring 43 is journalled about the centre line of the pot 14 and carries a gear rack, such as 44, for each wedge. Rotation of the ring by a drive applied thereto through a gear wheel 45 swings the wedge arms by means of toothed quadrants, such as 46, which are fixed to the arms and mesh with the respective racks. FIGURE 3 shows the wedge assembly contracted for maximum reactivity in the core and FIGURE 4 shows it fully expanded.

There is of course a wide variety of other ways in which the radial position of solid reflector material within a mass of liquid reflector may be varied. One that is very different from those described above, but still within the scope of the invention, entails arranging the solid reflector material in the form of a long sheet which at one end edge is fixed and is wrapped with numerous turns around the core like a clock spring; the other end edge would be connected to a driving means enabling it to be driven around a circular path so that the sheet convolutions may be drawn together close to the core or allowed to expand away from the core. Another possibility using movement of the solid reflector material in the axial direction of the core is to install two or more different closed shape solid reflector members of which any one can be positioned selectively around the core, the reflector liquid being thereby displaced; for example two interfitting stainless steel cylinders could be arranged for movement alternately into the reflector compartment. However, this possibility compared with the others so far mentioned is limited to changing the core reactivity in steps and is therefore less suitable for use in operational control of the reactor than those enabling stepless change.

Furthermore, the invention is not limited to the particular solid and liquid reflectors previously mentioned. Other combinations may be feasible in other circumstances; for example, in a fast reactor cooled by lead or a lead-bismuth alloy, the composite reflector could consist of the coolant in combination with graphite serving as the solid reflector material.

What we claim is:

1. In a nuclear reactor having a core, the combination comprising walling around said core to form a compartment for holding a mass of liquid reflector in a layer surrounding substantially continuously the radial periphery of said core, means for the charging of liquid reflector into the compartment, solid reflector material adapted to occupy selectively either one of two positions in the compartment, said material in a first one of said positions displacing liquid reflector in the compartment from an inward layer surrounding substantially continuously the radial periphery of said core and in the second position displacing liquid reflector in the compartment from a layer likewise surrounding substantially continuously the radial periphery of said core but outward of said inward layer, and means for driving the solid reflector material to said positions.

2. In a nuclear reactor having a core, the combination comprising walling around said core to form a compartment for holding a mass of liquid reflector in a layer surrounding substantially continuously the radial periphery of said core, means for the charging of liquid reflector into the compartment, solid reflector material disposed in the compartment with a movement capability in a direction generally radially of the core between inward and outward limits and constituting, at least in a position corresponding to the radially inward limit of said movement capability, a layer surrounding substantially continuously the radial periphery of said core thereby to form a composite reflector in conjunction with the liquid reflector charged into the compartment, and means for adjusting the position of the solid reflector material between the limits of the radial movement capability thereof whereby to enable by displacement of the liquid reflector an interchange of the positions of the solid and liquid reflectors.

3. In a nuclear reactor having a core, the combination comprising walling around said core to form a compartment for holding a mass of liquid reflector in a layer surrounding substantially continuously the radial periphery of said core, means for the charging of liquid reflector into the compartment, segments of solid reflector material disposed in the compartment and extending substantially the full length of the core, means supporting the segments for movement in a direction generally radially of the core between inward and outward limits and positioning the segments, at least when same are at the inner limit of the radial movement, in a juxtaposed relationship forming a layer of the solid reflector material surrounding substantially continuously the radial periphery of said core, and means for adjusting the position of the segments between the limits of the radial movement.

4. The combination according to claim 3, wherein further segments of solid reflector material are fixedly mounted in the compartment in a spaced relationship and have a wedge shape tapering towards the core, the means supporting the movable segments being adapted to position same for entry at the outward limit of the radial movement respectively into the spaces between the fixed segments.

5. The combination according to claim 3 wherein each of the movable segments has a wedge shape with one wedge face in a plane tangential to an imaginary cylindrical surface surrounded by the segments and with the other wedge face in a plane parallel to, and closely adjacent to, the tangential face of the next neighbouring segment whereby the segments together constitute a substantially solid layer of the solid reflector material, the means supporting the movable segments being adapted to move the individual segments in the general direction of the planes of said other faces.

6. The combination according to claim 5, wherein said supporting means comprise in respect of each segment an arm fixed at one end to the segment and pivotal at the other end about an axis extending parallel to the planes of the wedge faces.

7. The combination according to claim 3, wherein the means for adjusting the position of the segments is common to all the segments and is adapted to adjust the segments correspondingly and in a synchronous manner.

8. In a nuclear reactor having a core, the combination comprising a reactor vessel for containing the core, walling disposed within the vessel around said core to form a compartment for holding a mass of reflector liquid in a layer surrounding substantially continuously the radial periphery of said core, inlet and outlet paths to and from the compartment for the flowing of the liquid reflector therethrough, solid reflector material adapted to occupy selectively either one of two positions in the compartment, said material in a first one of said positions displacing liquid reflector in the compartment from an inward layer surrounding substantially continuously the radial periphery of said core and in the second position displacing liquid reflector in the compartment from a layer likewise surrounding substantially continuously the radial periphery of said core but outward of said inward layer, and means for driving the solid reflector material to said positions.

9. The combination according to claim 8, wherein the walling defines with the inner surface of the reactor vessel a gap communicating with the compartment at one end of the latter, and wherein the inlet path includes an inlet nozzle penetrating the reactor vessel from the exterior and communicating with the other end of the compartment and the outlet path includes the gap and an outlet nozzle which penetrates the reactor vessel from the exterior at a point where it opens into the gap remote from the said one end of the compartment.

10. The combination according to claim 9, wherein the liquid reflector is water and the solid reflector material is steel.

References Cited by the Examiner
UNITED STATES PATENTS

| | | | |
|---|---|---|---|
| 3,026,258 | 3/1962 | Huet | 176—41 X |
| 3,048,534 | 8/1962 | Tonks | 176—33 X |
| 3,124,514 | 3/1964 | Koutz et al. | 176—40 X |
| 3,164,525 | 1/1965 | Wetch et al. | 176—33 |
| 3,219,540 | 11/1965 | Costes | 176—33 X |

REUBEN EPSTEIN, *Primary Examiner.*